K. WANDEL.
PULP SCREEN.
APPLICATION FILED MAR. 17, 1916.
1,327,126.
Patented Jan. 6, 1920.
2 SHEETS—SHEET 1.
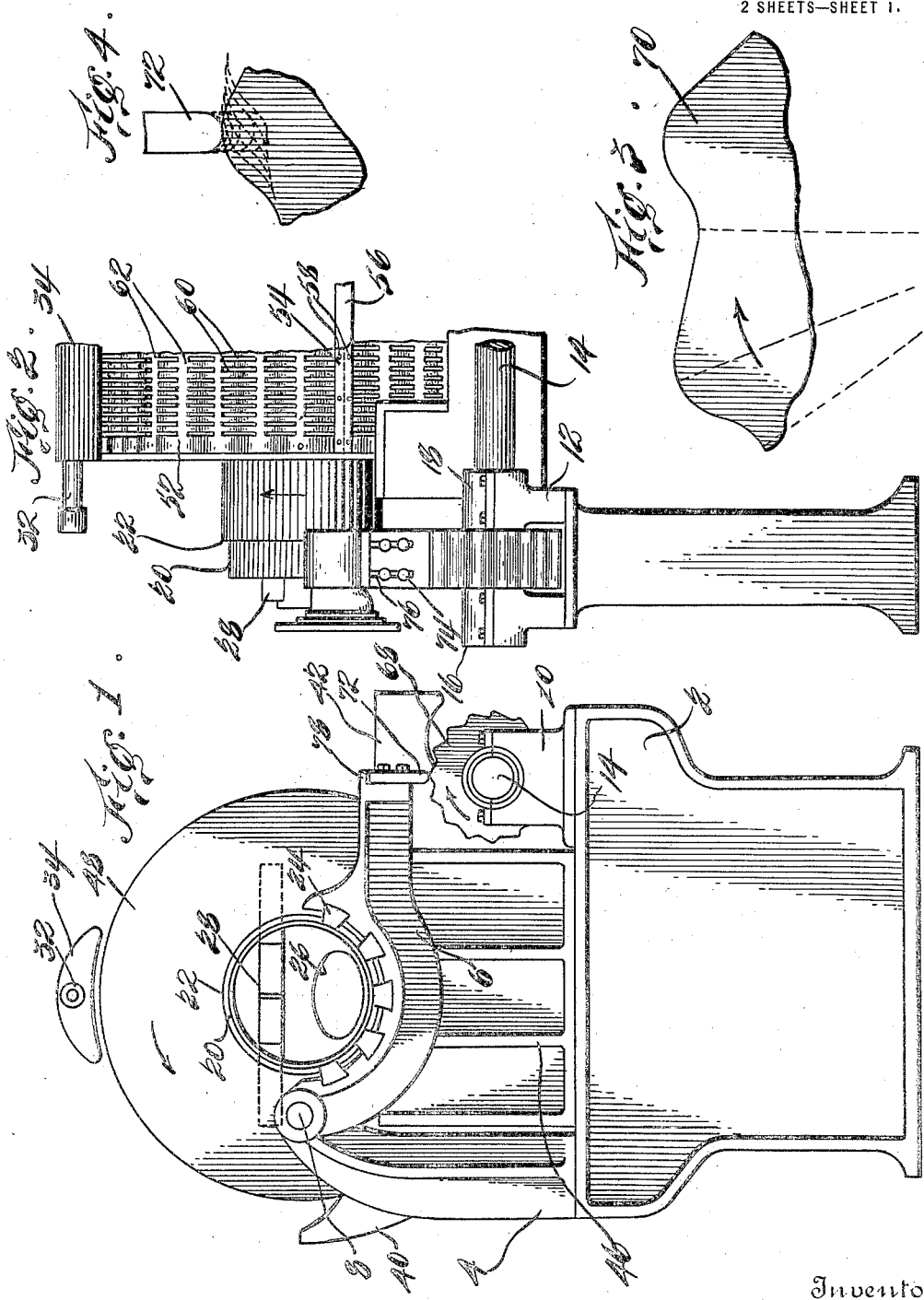

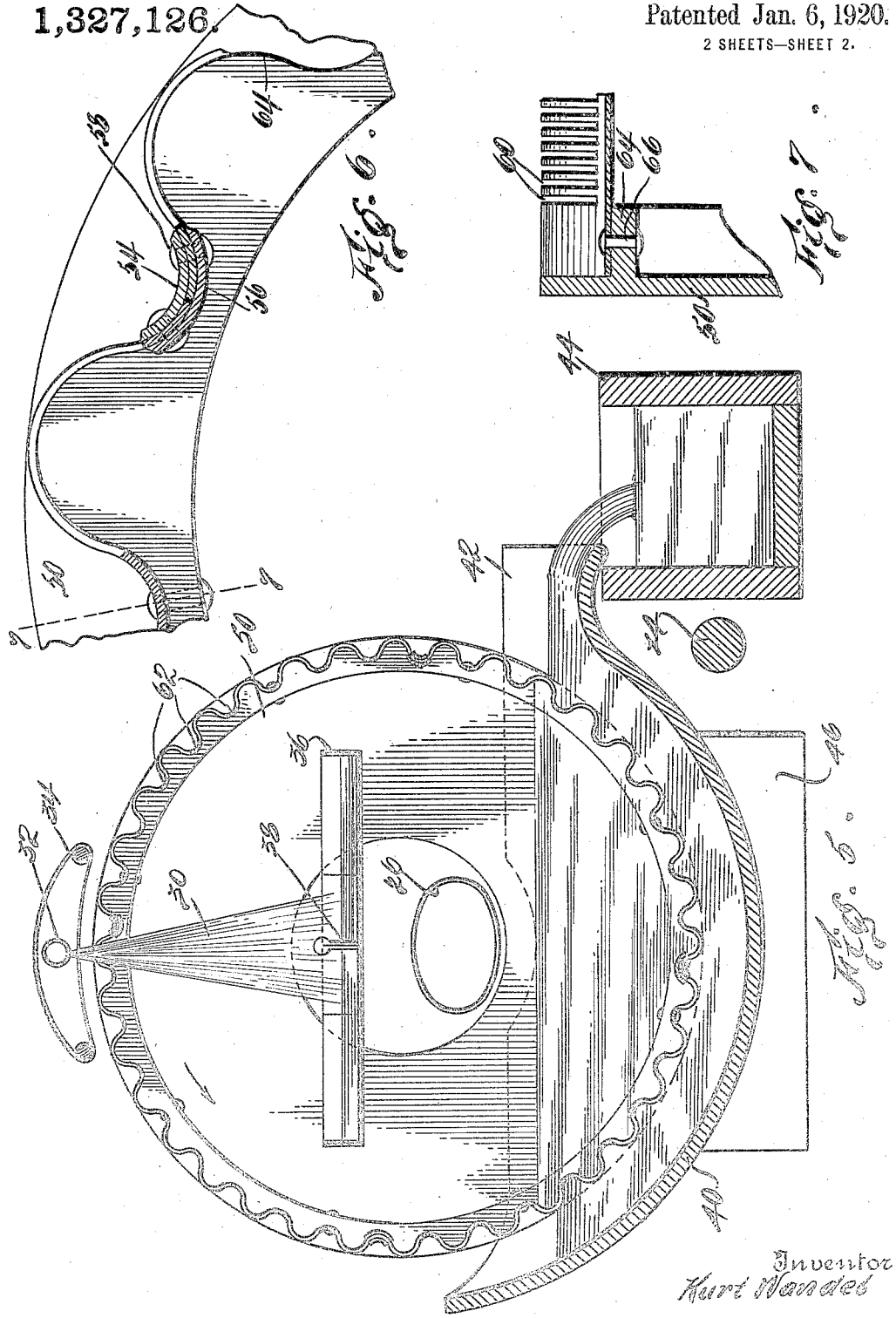

UNITED STATES PATENT OFFICE.

KURT WANDEL, OF NEW YORK, N. Y.

PULP-SCREEN.

1,327,126.  Specification of Letters Patent.  Patented Jan. 6, 1920.

Application filed March 17, 1916. Serial No. 84,772.

*To all whom it may concern:*

Be it known that I, KURT WANDEL, a citizen of the United States, residing at New York city, N. Y., have invented certain new and useful Improvements in Pulp-Screens, of which the following is a clear, full, and exact description.

This invention relates to screens or strainers, and particularly to machines for screening fibrous material such as paper pulp. The invention is herein shown as embodied in a rotary screen, in which type of screens the invention has especial utility, but it will be apparent that many features of the invention are of general applicability in the art to which it relates. It will be understood, therefore, that the invention is not restricted to its illustrated embodiment or to the uses herein set forth.

In the screening of paper pulp many advantages attend the use of rotary screens of the type which receives the pulp to be screened upon the inside of a vertically vibrated screening cylinder, particularly where the screen is to be used in direct connection with the paper-making machine. The only disadvantages of such screens, as compared with screens of other types, have been their limitations with respect to size and screening capacity and the excessive cost of upkeep by reason of the necessity for frequent renewal of the screening cylinder due to the strain imposed upon the cylinder by the vibrating movement usually imparted to it.

An object of the invention is to provide an improved construction of the screening wall of screens or strainers, which will be of general utility in the screen art and which will be particularly useful in overcoming the disadvantages hitherto experienced in the use of rotary screens.

Another object of the invention is so to improve the construction and mode of operation of rotary screens that not only may the capacity and the durability of screens of this type be increased, but also their efficiency.

As hereinabove suggested, rotary screens of the type known to the trade as "Wandel" screens, comprise a rotary screening cylinder upon the inside of which the paper pulp or other material to be screened is received and mechanism for vertically vibrating said cylinder, said mechanism being preferably constructed and arranged to impart a step-by-step rotation to said cylinder. In screens of this type as hitherto constructed, difficulty has been experienced in obtaining the proper vibration of the screen and at the same time avoiding undue wear and objectionable noise.

A further object of the invention is to improve screens of this type in the foregoing respects, and to provide a construction which is not only more durable and less noisy in operation, but in which the motion imparted to the screen will be more effective for securing rapid and proper screening.

An important feature of the invention is a rotary screening cylinder having a corrugated peripheral screening wall in which the screening openings are so arranged in the corrugations that the capacity of the cylinder is increased and in which the corrugations are so arranged that they increase the strength of the cylinder to resist injury due to lateral strains, without interfering with those slight changes in the shape of the cylinder during the vibrating operation which have been found so useful in facilitating the screening operation.

Other objects and important features of the invention will appear from the following description and claims when considered in connection with the accompanying drawings, in which—

Figure 1 is an end elevation of a rotary screen of the "Wandel" type embodying the present invention;

Fig. 2 is a side elevation of one end of the machine;

Fig. 3 is a detail view showing the lay-out of the cams for securing the novel vibrating movement of the screen;

Fig. 4 is a view showing successive stages of the vibrating movement;

Fig. 5 is a transverse section through the screen;

Fig. 6 is a detail transverse section showing the connection of the screen plates and the manner of mounting them upon the end walls of the cylinder; and Fig. 7 is a section on the line 7—7 of Fig. 6.

The illustrated screen, which is of the Wandel type, comprises a stand formed of two end castings 2, upon which are carried brackets or supports 4 for the drum-supporting levers or arms 6, which are fulcrumed at 8 upon the upper ends of said brackets 4, and other brackets 10 and 12 at each end of the machine which support the driving shaft 14. One half of the bearing of the driving shaft is preferably formed in each of the brackets 10 and 12, and the other half in clamp members 16 and 18, which may be removed when it is desired to remove the shaft for renewal or replacement of the parts carried by the shaft.

As shown in Fig. 1 of the drawings, each of the arms 6 has a curved portion which provides a bearing seat for the trunnions 20 which support the screening drum or cylinder, these trunnions being shouldered at 22 to prevent endwise movement of the cylinder. The bearing seats are preferably provided with cushioning blocks 24 which may be made of fiber, wood, or any other suitable material. As shown, the trunnions 20 are hollow, and, as is usual in this type of screens, are utilized for the introduction of the material to be screened into the cylinder by means of an inlet pipe 26 and for the removal of the dirt which is screened from the pulp through conduits 28, this material being washed from the screen by a shower 30 from the usual shower pipe 32 beneath the hood 34, and being received in the waste trough 36 which comprises, as usual, two parts hinged at 38 so that they may be folded together for introduction into the cylinder and removal therefrom through the trunnion openings.

The illustrated screen comprises also the usual tank or vat 40 which preferably has its bottom curved so that it is substantially concentric with the axis of rotation of the cylinder, this tank being so located that the screening cylinder will dip into the screened material in the tank, which screened material flows from the tank, through the overflow 42, into a trough or conduit 44, or directly into the paper-making machine. The tank is supported at its end upon brackets 46 carried by the stand members 2.

Screens of this type, as hitherto constructed, have been limited in size and therefore in screening capacity by considerations of strength and durability. In operation the cylinder is vibrated up and down in order to insure a movement of the pulp back and forth through the interstices of the screen and a proper screening of the pulp and stirring up of the fibers in the liquid in which they are carried, and this vibration puts a great strain upon the cylinder, particularly if the cylinder is relatively long and of a relatively large diameter, the cylinder being supported only at its ends. As hitherto constructed, this vibration has tended to break the screening wall of the cylinder and the maximum diameter and length of the cylinder has been limited by the practical considerations of strength and durability hereinabove referred to.

An object of this invention is not only to provide a greater screening surface in a cylinder of the same diameter but so to construct the screening wall of the cylinder that cylinders of larger diameter and greater length may be successfully used. To this end the invention contemplates the provision of a cylinder having a corrugated screening wall and having the screening openings in both the hills and valleys of the corrugations so that the effective screening surface is materially increased. In the illustrated construction, the cylinder has end walls 48 and 50 connected by a corrugated peripheral wall 52, which, for convenience in manufacture, may be made up of segmental plates having their adjacent edges abutting, these plates being connected by outside and inside concentric ribs 54 and 56, which may be riveted to the respective plates by rivets 58, as shown in Fig. 6. These ribs extend lengthwise of the cylinder and serve to stiffen the cylinder as a whole.

The screening openings in the wall 52 of the cylinder are preferably in the form of parallel slots 60 transverse to the corrugations and preferably extending across the valleys of the corrugations and into the hills when considering the corrugations from the inside of the cylinder. Successive sets of these slots about the periphery of the cylinder are preferably separated in the hills by solid portions 62 of the wall, which portions are preferably continuous lengthwise of the cylinder, or at least continuous lengthwise of the particular segmental plate of which they form a part. It will be understood, of course, that if desired or required for convenience of manufacture, the cylinder may likewise be made of a plurality of plates joined by reinforcing and connecting ribs extending about the periphery of the cylinder as well as of a plurality of segmental plates joined by longitudinal ribs, as hereinabove described. The end walls 48 and 50 of the cylinder are preferably provided with corrugated shoulders or flanges 64 to fit the corrugations in the wall 52, to which shoulders the wall 52 may be riveted at intervals about its periphery by rivets 66, as shown in Figs. 5, 6 and 7.

An important feature of the invention is the improved means for effecting the vertical vibration of the cylinder and the rotation of the cylinder. In machines as hitherto constructed, the cylinder has usually been lifted and then allowed to drop freely under the action of gravity. The shock to the cylinder and the strain upon its structure is considerable, and moreover, the noise incident to the operation of a construction of this type has been considerable and very objectionable.

By the improved vibrating mechanism herein shown and described, not only are the objectionable features of prior constructions substantially eliminated, but a more effective vibration of the cylinder is obtained.

As shown in Figs. 1 to 4 inclusive, the mechanism for vibrating the cylinder comprises a cam-wheel 68 upon each end of the machine, which has formed upon it a series of cams 70 that act successively upon a bearing member 72 carried by the arm 6, this bearing member being attached to said arm 6 by cap screws 74 extending through slots 76 in the member 72 and threaded into the arm 6. At its upper end, the bearing member 72 abuts against an overhanging shoulder 78 upon the arm 6. The construction just described permits the adjustment of the bearing member 72 to take up for wear, a gib being preferably placed between the shoulder 78 and the upper end of the bearing member 72, in order to receive the thrust, whenever the bearing member is adjusted downwardly on the arm 6.

The cams 70 on the cam-wheel 68 are so shaped that the bearing member 72 may remain constantly in contact with the cams and yet have imparted to it a movement which is more rapid downwardly than it is upwardly. As shown particularly in Fig. 3 of the drawings, it will be seen that the curvature of each of the cams 70 is such that substantially three-fifths of the angle of rotation of the wheel 68, which is utilized in effecting the oscillation of the arm 6, is utilized in lifting the arm, and only two-fifths of this angle in lowering the arm. The advantage of this differential reciprocation is that during the rapid downward movement of the cylinder, a suction is created which draws the liquid back through the slots in the cylinder and thus stirs up the pulp fibers upon the inside of the cylinder to allow any fibers that may have become lodged crosswise of the slots to get into position to move through the slots during the next upward movement of the cylinder.

It will be noted that the fulcrum 8 of the lever or arm 6 is nearer the axis of the drum and nearer a horizontal line through this axis than the point where the bearing member 76 engages the cam-wheel 68. The result of this location of these points is that there is imparted to the cylinder a tendency to rotate in the direction of the arrow, as shown in Figs. 1 and 5. This rotation of the cylinder serves to carry the dirt and lumps that have been screened from the pulp up into position to be acted upon by the shower 30. It will be noted also that the corrugations upon the inside of the cylinder also facilitate the carrying of this screened material into position to be washed from the inside of the cylinder, and at the same time they serve to effect a movement of the pulp upon the inside of the cylinder which increases the screening action of the cylinder. It will also be noted that the direction of the rotation of the cylinder through the tank 40 is such that it helps the movement of the screened pulp through the tank, the corrugations upon the outside of the cylinder aiding in accelerating the movement of the pulp through the tank. Moreover, these outside corrugations increase the screening action, due to the up and down movement of the cylinder, by confining the liquid between their side walls and thus forcing it through the slots as the cylinder moves up and down.

From the foregoing description, it will be seen that the present invention provides a rotary screen which is very simple, strong and durable in construction, which has a marked increase in capacity over screens of the same size as hitherto constructed, and which performs the screening operation more effectively than rotary screens of the prior art.

From an inspection of Figs. 1, 2 and 5 of the drawings, it will be seen that the driving shaft 14 is located beneath the overflow part 42 of the tank 40. By arranging the parts of the machine in this relation and by constructing the arm 6 in the manner shown in Fig. 2, the amount of floor space required for the machine has been materially reduced and at the same time the construction of the machine has been much simplified.

As hereinabove pointed out, the bearings for the shaft 14 are so constructed that the shaft can be easily removed, one purpose of this construction being to provide for the replacement of the cam-wheels 68 by cam-wheels having cams of different curvature or different numbers of cams, when it is desired either to vary the length of the vibrating movement of the cylinder, or to vary the number of vibrations per minute. The use of interchangeable cams for this purpose is preferable to the use of an adjustment, since the parts of the adjustment usually jar loose and shorten the life of the machine as well as add to the noise of operation.

Although the invention is shown as embodied in a cylinder screen of the outward flow type, it will be obvious that many features of the invention are useful in screens of other types.

What I claim as new is:—

1. A screen or strainer, comprising a material receptacle having a corrugated screening wall, and means for causing a combined rotating and vibrating relative movement of said wall and the material to be screened.

2. A screen or strainer, comprising a receptacle for the material to be screened, said receptacle having a corrugated screening wall and having slots through said wall which extend across the valleys of the screening surface and into the hills, and means for vibrating said wall.

3. A screen or strainer, comprising a horizontal rotary drum having a peripheral screening wall, portions of which lie substantially normal to radii from the axis of rotation and other continuous portions of which lie at different angles to said radii, and means for rotating said drum and for vibrating said screening wall transversely to the axis of rotation.

4. A screen or strainer, comprising a horizontal rotary drum having a peripheral screening wall, portions of which lie substantially normal to radii from the axis of rotation and other continuous portions of which lie at different angles to said radii but parallel to said axis, and means for rotating said drum and for vibrating said screening wall transversely to the axis of rotation.

5. A rotary screen or strainer, comprising a rotary drum having a corrugated peripheral screening wall supported only at its ends, the corrugations extending lengthwise only of said drum and from one end to the other, whereby they stiffen the drum lengthwise while permitting transverse distortion, and means for rotating and for bodily vibrating said drum.

6. A rotary screen or strainer, comprising a horizontal rotary drum having its peripheral wall corrugated and provided with slots extending through said wall transverse to the corrugations, and means for rotating said drum about a horizontal axis and for vibrating it transversely to said axis.

7. A rotary screen or strainer, comprising a horizontal rotary drum having its peripheral wall corrugated and provided with slots transverse to the corrugations and extending through the valleys of said corrugations and into the hills, means for introducing material to be screened into said drum and means for rotating said drum and for vibrating it.

8. A rotary screen or strainer, comprising a rotary drum having its peripheral wall corrugated and supported only at its ends, the corrugations extending substantially parallel to the axis of said drum throughout the length of the drum, and said wall being provided with parallel slots extending continuously through the valleys of the corrugations and into the hills, successive sets of slots about the periphery of said drum being separated by solid portions of said drum continuous in the hills lengthwise of the drum.

9. A rotary screen or strainer, comprising a horizontal rotary drum having its peripheral wall corrugated, said corrugations extending lengthwise only of said drum and from one end thereof to the other and being provided with screening slots transverse to the corrugations, means for rotating said drum, and means for intermittently lifting said drum bodily.

10. A rotary screen or strainer comprising a rotary drum having its peripheral wall corrugated and provided with slots cutting across the corrugations, and means for imparting to said screen an intermittent rotary movement.

11. A rotary screen or strainer, comprising a horizontal rotary drum having a corrugated peripheral screening wall, a tank for the screened material and into the screened material in which said drum dips, means for rotating said drum in said screened material, and means for vertically vibrating said drum bodily constructed to permit a return movement of said drum more rapid than the lifting movement.

12. A rotary screen or strainer, comprising a rotary drum having a corrugated peripheral screening wall, a tank into which the screening material is discharged and into the screened material in which said screen dips, and means for vibrating said screen in and rotating it through said material in said tank.

13. A rotary screen or strainer, comprising a rotary drum having a corrugated peripheral screening wall, a tank into which the screened material is discharged and into the screened material in which said screen dips, said tank having a discharge opening, means for vibrating said screen in the material in said tank and for rotating said screen through said material in the direction of flow of the screened material through said tank.

14. A rotary screen or strainer, comprising a horizontal rotary drum having a corrugated peripheral screening wall supported only at its ends, the corrugations extending lengthwise only of the drum and from one end thereof to the other and being provided with screening slots transverse to said corrugations, a tank into which the screened material is discharged and into the screened material in which said drum dips, and means for rotating said drum through said screening material and for bodily vibrating said drum in said screened material.

Signed at New York, N. Y. this 16th day of March 1916.

KURT WANDEL.

Witnesses:
BEATRICE MIRVIS,
CHAS. CLARK.